(12) United States Patent
Argyros et al.

(10) Patent No.: US 10,572,583 B2
(45) Date of Patent: Feb. 25, 2020

(54) MERGING DOCUMENTS BASED ON DOCUMENT SCHEMAS

(71) Applicant: Promontory Financial Group, LLC, Washington, DC (US)

(72) Inventors: Kelly A. Argyros, Fairfax, VA (US); Joan W. Tomlinson, Alexandria, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/820,929

(22) Filed: Nov. 22, 2017

(65) Prior Publication Data

US 2019/0155886 A1    May 23, 2019

(51) Int. Cl.
*G06F 17/00* (2019.01)
*G06F 17/24* (2006.01)
*G06F 17/22* (2006.01)
*G06F 16/93* (2019.01)

(52) U.S. Cl.
CPC ............ *G06F 17/243* (2013.01); *G06F 16/93* (2019.01); *G06F 17/2211* (2013.01)

(58) Field of Classification Search
CPC .................................................. G06F 17/2211
See application file for complete search history.

(56) References Cited

U.S. PATENT DOCUMENTS

| | | | |
|---|---|---|---|
| 6,507,856 B1* | 1/2003 | Chen ...................... | G06Q 30/04 707/999.001 |
| 7,006,992 B1 | 2/2006 | Packwood | |
| 7,818,662 B2* | 10/2010 | Nene ...................... | G06Q 10/10 715/223 |
| 8,185,816 B2* | 5/2012 | Davis ................ | G06F 17/30882 715/209 |
| 8,234,312 B2* | 7/2012 | Thomas ................. | G06F 16/258 707/803 |
| 8,745,096 B1* | 6/2014 | Noble ................... | G06F 16/258 707/811 |
| 2006/0020570 A1* | 1/2006 | Wu .................... | G06F 17/30359 |
| 2007/0263012 A1* | 11/2007 | Panditharadhya ..... | G06Q 10/06 345/629 |
| 2008/0027899 A1* | 1/2008 | Khunteta ............ | G06F 17/3092 |
| 2008/0235260 A1* | 9/2008 | Han ..................... | G06F 17/2247 |
| 2010/0070448 A1* | 3/2010 | Omoigui ............. | H01L 27/1463 706/47 |
| 2010/0192057 A1* | 7/2010 | Majidian ........... | G06F 17/30908 715/237 |

(Continued)

*Primary Examiner* — Mustafa A Amin
(74) *Attorney, Agent, or Firm* — Cuenot, Forsythe & Kim, LLC (57) ABSTRACT

Document schemas for a first document from a first data source and a second document from a second source are identified. The document schema includes a set of tags and data elements corresponding to the set of tags. Based on the identified document schema, the set of tags of the first document to the set of tags of the second document are mapped. Portion of the first document is formatted based on the mapped set of tags. The formatted portion of the first document is positioned parallel to corresponding portion of the second document. The formatted first document and the second document are merged then displayed on the computer device.

23 Claims, 5 Drawing Sheets

(56) References Cited

U.S. PATENT DOCUMENTS

| | | | |
|---|---|---|---|
| 2012/0130945 A1* | 5/2012 | i Dalfo | G06F 17/30578 |
| | | | 707/610 |
| 2013/0151940 A1* | 6/2013 | Bailor | G06F 17/24 |
| | | | 715/229 |
| 2014/0375667 A1 | 12/2014 | Reville et al. | |
| 2015/0006206 A1 | 1/2015 | Mdeway | |
| 2015/0199744 A1* | 7/2015 | Tolvanen | G06Q 30/0631 |
| | | | 707/737 |
| 2016/0070685 A1* | 3/2016 | Williams | G06F 17/2247 |
| | | | 715/234 |
| 2016/0155202 A1* | 6/2016 | Huang | G06K 9/00463 |
| | | | 382/176 |
| 2017/0024288 A1* | 1/2017 | Ahmed | G06F 11/1469 |
| 2018/0081962 A1* | 3/2018 | Obitko | G06F 17/30613 |

* cited by examiner

MERGING DOCUMENTS BASED ON DOCUMENT SCHEMAS

TECHNICAL FIELD

The present invention relates generally to a method, system, and computer program product for formatting documents for display in graphical user interface. More particularly, the present invention relates to a method, system, and computer program product for merging documents based on document schemas.

BACKGROUND

Unstructured data (or unstructured information) refers to information that either does not have a pre-defined data model or is not organized in a pre-defined manner. Unstructured information is typically text-heavy, but may contain data such as dates, numbers, and facts as well. This results in irregularities and ambiguities that make it difficult to understand using traditional programs as compared to data stored in fielded form in databases or annotated (semantically tagged) in documents.

Document schemas are the highest level of the metadata structure associated with a document file. They allow a user to control and manipulate the documents or files that are added into a database. Document schemas are a way to group or otherwise associate like files together even when they are filed in disparate places across several databases. Document schemas manage how files are added to the documents and what information is collected about them via the metadata.

SUMMARY OF THE INVENTION

The illustrative embodiments provide a method, system, and computer program product. An aspect of the present invention receives a first document from a first data source. The aspect of the present invention identifies document schemas for a first document from a first data source and a second document from a second source. In this aspect, the document schema includes a set of tags and data elements corresponding to the set of tags. The aspect of the present invention maps the set of tags of the first document to the set of tags of the second document based on the identified document schemas. The aspect of the present invention formats portion of the first document based on the mapped set of tags. In one aspect, the formatted portion of the first document is positioned parallel to corresponding portion of the second document. The aspect of the present invention merges the formatted first document and the second document and causes a computer device to display the merged documents.

An aspect of the present invention includes a computer program product. The computer program product includes one or more computer-readable storage devices, and program instructions stored on at least one of the one or more storage devices.

An aspect of the present invention includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE EMBODIMENTS

Documents can be generated based on a common template. Based on the template, the documents can range from a stream of unstructured text, or a semi-structured text in which a value corresponds to a category. In addition, a document may include a set of categories in which a user can assign values indicating different aspects indicative of such categories. In many cases, such values can be restricted by Boolean format (e.g., "yes" or "no", "true" or "false") or they can be assigned with integer or floating numbers (e.g., 3, 2.2).

As these documents are generated, another user may desire to aggregate the data assigned to these documents, in particular when such data characterizes, rates, or otherwise describes a single subject, e.g., a corporation. When these document templates are created from various sources and completed by different types of users, each of which having its own bias and agenda, however, it becomes difficult to assess the accuracy of the aggregated data as well as how the templates relate to each other.

For example, the illustrative embodiments recognize that risk assessment reports can be derived from different sources within the same organization. For example, one risk assessment report may be generated from the compliance department, which may identify, prioritize, and assign accountability for managing existing or potential threats related to legal or policy noncompliance—or ethical misconduct—that could lead to fines or penalties, reputational damage, or the inability to operate in key markets. In particular, compliance department, when preparing its risk assessment report, primarily focuses on laws and regulations with which the organization is required to comply in all jurisdictions where it conducts business, as well as critical organizational policies—whether or not those policies are based on legal requirements.

On the other hand, another risk assessment report may be generated from the operational risk department. In several embodiments, operational risk is defined as the risk of loss resulting from inadequate or failed internal processes, exposed systems or external events. This definition may be extended for non-regulatory purposes to encompass legal risk and strategic risk (i.e. the risk of making a poor business decision). Some of the most important types of operational risk involve breakdowns in internal controls and corporate governance. Such breakdowns can lead to financial losses through error, fraud, or failure to perform (i.e. address risk events) in a timely manner or cause the interests of a financial institution to be compromised in some other way (e.g. staff exceeding their authority or conducting business in an unethical or risky manner). Major publicized losses at financial institutions in recent years illustrate the enormity of loss events resulting from the failure of or non-existence of operational risk management systems. Major losses caused by information technology systems failures, disasters, and rogue trading, for example, have cost financial institutions and firms vast sums of money, diminished shareholder value, and tarnished their reputation with the general public.

In view of these different focus of each of these departments, risk assessment reports may be subjective, since these reports can be submitted by different sources, each of which prioritizing one aspect or category over another. Although receiving different sets of risk assessment reports from various sources may provide a comprehensive overview of an organization, there may be situations in which those risk assessment reports are needed to be normalized and formatted to provide a more objective risk assessment of such organization. Moreover, the illustrative embodiments recognize that an organization may simply want to view separate risk assessment reports simultaneously within a single graphic interface, wherein the portions of each risk assessment reports are re-organized to provide a side-by-side comparison between the risk assessment reports.

The illustrative embodiments recognize that not all documents will include the exact same categories. For example, the difference may be even more pronounced when the risk assessment reports are generated from different business departments, which may prioritize certain risk category while disregarding the other. Because of this nature, it becomes difficult to analyze risk assessment reports in a manner that the data fields from one report are properly mapped to the corresponding data fields of the other report.

The illustrative embodiments recognize that the documents may need to be further customized to allow a user to change values in certain data fields. In other cases, the documents generated from the templates may need to allow a user to remove certain categories or data fields which may not be relevant to the analysis of a subject. In many cases, the changes and removals of such data fields may impact the remaining values towards the subject thus providing a more accurate perspective of the subject within the relevant context.

In addition, the illustrative embodiments also recognize that the documents must retain their data integrity, even after these documents are normalized, formatted, or transformed to provide different sets of data. For example, due diligence conducted by these different departments can easily be compromised and any valuable insights from the original risk assessment reports may be lost. Worse, organizations may rely on faulty simulations of the risk assessment reports and be exposed to civil penalties and sanctions. It is thus needed that any normalization or customization of the risk assessment reports from various departments can be reverted back into their original format.

The illustrative embodiments recognize that the presently available tools or solutions do not address the needs or provide adequate solutions for these needs. The illustrative embodiments used to describe the invention generally address and solve the above-described problems and other problems related to graphical user interfaces in which two documents originating from two sources can be mapped yet retain each of its data integrity.

An embodiment can be implemented as a software application. The application implementing an embodiment can be configured as a modification of an existing software platform, as a separate application that operates in conjunction with an existing software platform, a standalone application, or some combinations thereof.

In one embodiment, a document may be generated, in which the document includes a schema with a set of categories and corresponding values assigned to such set of categories. For example, a risk assessment report is generated through calculating an aggregate of various ratings for each risk category. The report is determined through the ratings indicative of whether an organization is assigned with a "high" likelihood under sanctions category or have a "moderate" likelihood under legal impact category. Once these various ratings for each risk category are submitted, the application may generate an overall risk rating for the organization. In various embodiments, a user may generate a document pertaining to only a part of the subject in question, e.g., a business unit of an organization, and may select specific categories in which such part will be relevant and need to be assessed, e.g., for compliance and operational risk. In such embodiment, the application generates a subset of categories to limit a user to assign values to only such subset.

In one embodiment, a plurality of documents may be received, each of which is generated from different sources, e.g., business departments. The documents are parsed to identify data fields (e.g., risk category), which the data fields of a first document can be mapped to corresponding data fields of the second document. More specifically, the application identifies the document schema of each document and the tags along with its corresponding values within such document schema. The identified tags of the first document are then compared to the tags of the second document, and the tags sharing similar data will be mapped and indexed into a database. Based on the results of the comparison, the documents may be formatted in a manner that the data fields with matching tags are aligned together. In some embodiments, the mapped and indexed tags may be stored in a new database temporarily specifically created to store such tags.

In one embodiment, the application identifies weighted factors used in generating each document and manipulates these weights to normalize the values of the documents. For instance, if a higher weight factor is assigned to the "reputational impact" rating of the first risk assessment report as compared to the factor assigned to the second risk assessment report, the application set the weight factors to default values for both risk assessment reports, thus enabling a more objective comparison between the values of the risk assessment reports.

In one embodiment, the mapped and weighted risk assessment reports can be merged and presented simultaneously in a single graphical user interface. For example, the two risk assessment reports can be presented side-by-side. In several embodiments, the application also includes a functionality to allow the user to export separate reports for each department category.

In one embodiment, a document may be parsed to provide several tags, each of which can be cast as an interactive graphical user interface element (e.g., HTML5 drag-and-drop element) as the document is formatted for display on the user graphic interface screen. The interactive graphical user interface element can allow a user to move such element to different areas of the graphical user interface. In other embodiments, the customizable tags allow a user to change the values within the fields and simulate how such changes impact the values in the other data fields in such risk assessment report.

Another embodiment of the present invention detects a change in the value of the first document then reports the change to the other data sources to which their documents are linked to the first document. In this embodiment, the application detects that a value has been changed then identifies the tag associated with such data field. The identified tag can be used as a query to search the database storing any indexed tags for other documents. Based on the query results, the application may notify the administrators of the other data source, that the values in the related risk assessment report have been altered.

In some embodiments, the values assigned to different categories of the documents may be aggregated to provide a composite value. For example, the composite value can be a redundant risk rating corresponding to the risk assessment reports. In one embodiment, the composite value can be compared to a threshold value, which when exceeded, trigger a series of conditional actions such as alerting the administrators to perform follow-up actions. In another embodiment, a remediation report may be generated based on the composite value exceeding the threshold value.

The illustrative embodiments are described with respect to certain types of tags, documents, reports, variables, document schema, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
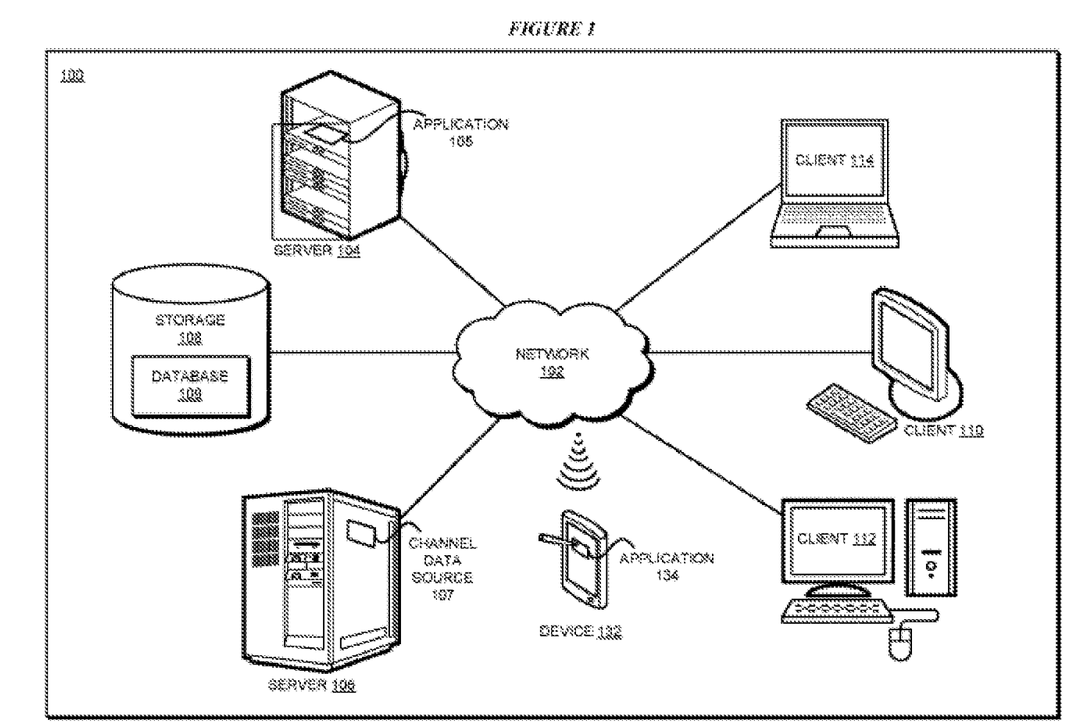
FIG. 1 depicts a block diagram of a network of data processing systems in which illustrative embodiments may be implemented.
Figure 2:
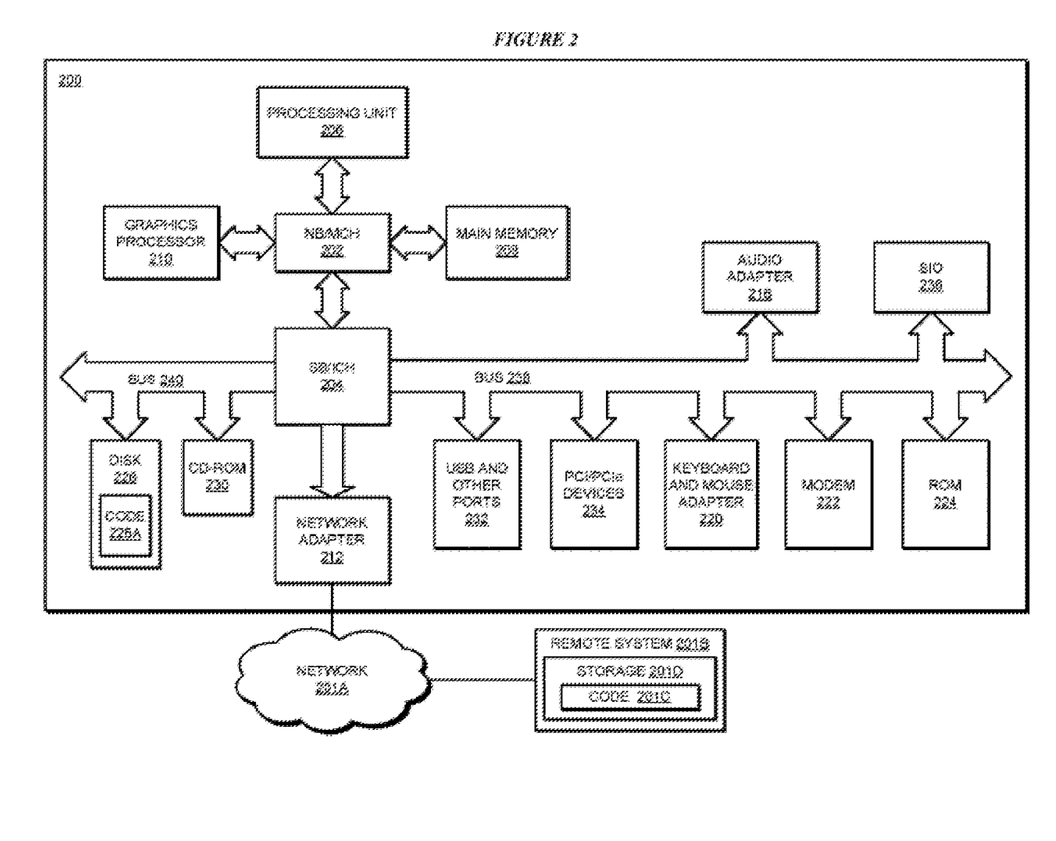
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 alone, application 134 alone, or applications 105 and 134 in combination implement an embodiment described herein. Channel data source 107 provides the past period data of the target channel or other channels in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and/or application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
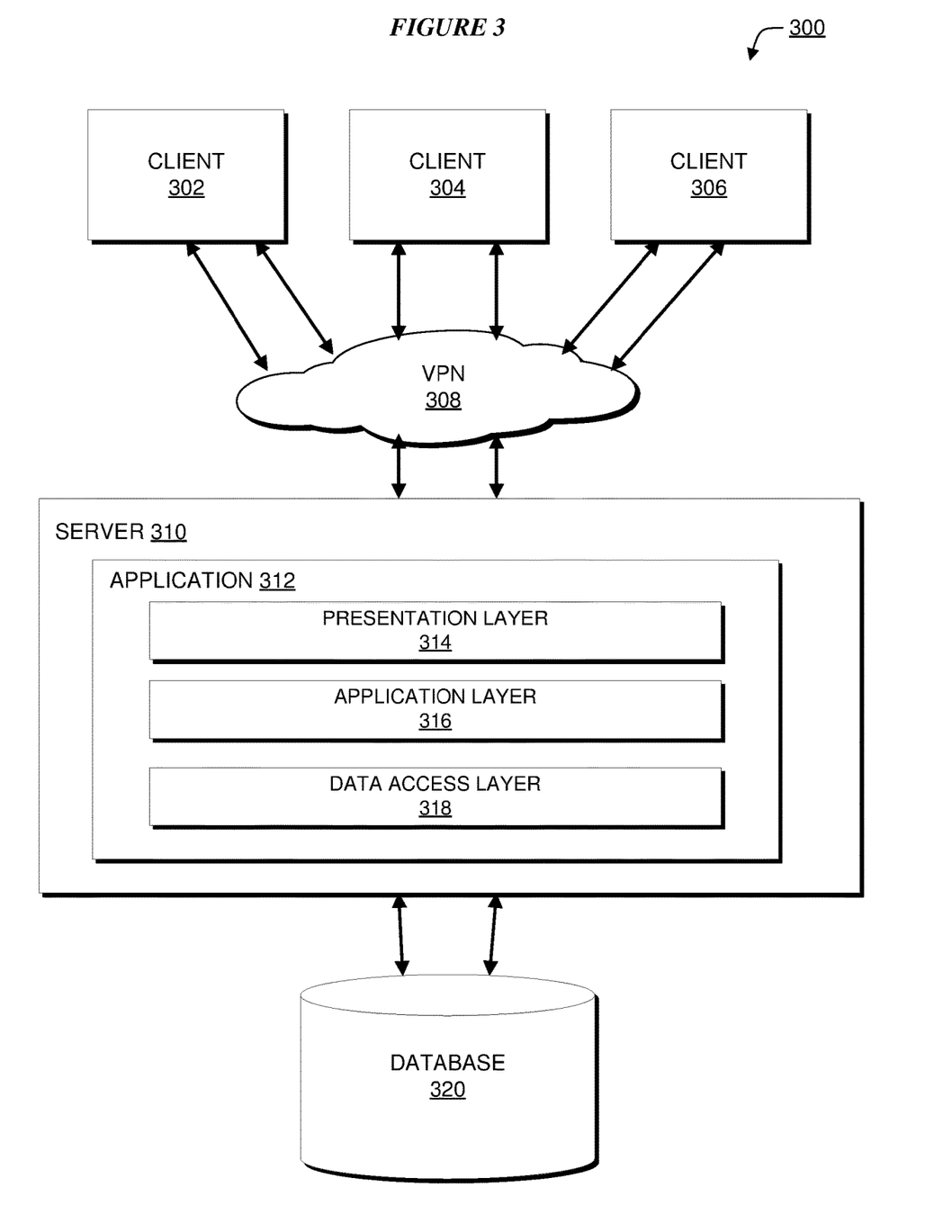
FIG. 3 depicts a block diagram of an example software architecture that implements merging documents in accordance with an illustrative embodiment.

With reference to FIG. 3, this figure depicts a block diagram of an example software architecture that implements merging documents in accordance with an illustrative embodiment. Application 312 is an example of application 105 in FIG. 1. Clients 302, 304, and 306 are an example of clients 110, 112, and 114 in FIG. 1. Server 310 is an example of servers 104 and 106 in FIG. 1.

Virtual private network (VPN) 308 uses tunneling, encryption, and authentication to provide secure communications between two or more devices, e.g., between clients 302, 304, and 306 and server 310. For example, client 302 may connect to a VPN server, and the client computing device may securely communicate with devices (e.g., server 310) on a private network over the public network, such as the public internet, via the VPN server.

Presentation layer 314 include a set of program instructions to generate a graphical user interface that displays documents that were outputted from application layer 316. These documents can be formatted to interactive graphic elements in which parts of the documents can be moved around the graphical user interface so as to allow the user to arrange contents of the documents to be displayed side-by-side.

Application layer 316 include a set of program instructions to retrieve documents from data access layer 318 and parse the documents for presentation layer 314. In one embodiment, application layer 316 parses the documents to identify data fields for a document (e.g., risk assessment report from the compliance department) that matches the fields for other document (e.g., risk assessment report form the operational risk department). In this embodiment, application layer 316 may generate a database record indicative of the matching data fields and push it down to data access layer 318. In another embodiment, a database record indicating the matching data fields for both documents may already exist in database 320. In that case, application 316 may issue program instructions to data access layer 318 to retrieve such database records.

Data access layer 318 may act as an intermediary between server 310 and database 320 to retrieve database records from database 320 and push any query results onto application layer 316. This may include a query requesting information identifying matching data fields between two risk assessment reports. Data access layer 318 may provide access to data stored in persistent storage, such as a relational database. Rather than making calls directly to databases, application layer 316 can make calls to data access layer 318 which acts as a logical entity between a web server and a physical database. Application layer 316 can then use data retrieved via data access layer 318 in generating output for presentation to end users via the website. The use of data access layer 318 provides improved scalability in transactional database architectures and facilitates database partitioning and migration while minimizing disruption to system operations. Data access layer 318 may employ an object-relational mapping that facilitates the establishment of a logical entity with which a web server can interact. In some embodiments, a database query (e.g., SQL) can be constructed based on the input from application layer 316.

Database 320 may be implemented through a relational database in which the records are organized into a tabular format, having rows and columns in which the corresponding information can be stored in a "structured" format. Examples of a relational database include SQL and IBM® DB2®. The records stored in a relational database can be retrieved by executing a query constructed through user input.

In other embodiments, database 320 may be a non-relational database such as NoSQL. A NoSQL database environment is a non-relational and largely distributed database system that enables rapid, ad-hoc organization and analysis of extremely high-volume, disparate data types. NoSQL databases are sometimes referred to as cloud databases, non-relational databases, Big Data databases and a myriad of other terms and were developed in response to the sheer volume of data being generated, stored and analyzed by modern users (user-generated data) and their applications (machine-generated data).

In general, NoSQL databases have become the first alternative to relational databases, with scalability, availability, and fault tolerance being key deciding factors. They go well beyond the more widely understood legacy, relational databases (such as Oracle, SQL Server, and DB2 databases) in satisfying the needs of today's modern business applications. A very flexible and schema-less data model, horizontal scalability, distributed architectures, and the use of languages and interfaces that are "not only" SQL typically characterize this technology. Contrary to misconceptions caused by its name, NoSQL does not prohibit structured query language (SQL). While it's true that some NoSQL systems are entirely non-relational, others simply avoid selected relational functionality such as fixed table schemas and join operations. For example, instead of using tables, a NoSQL database might organize data into objects, key/value pairs or tuples.

There are four general types of NoSQL databases, each with their own specific attributes:

Graph database—Based on graph theory, these databases are designed for data whose relations are well represented as a graph and has elements which are interconnected, with an undetermined number of relations between them. Examples include Neo4j and Titan.

Key-Value store—we start with this type of database because these are some of the least complex NoSQL options. These databases are designed for storing data in a schemaless way. In a key-value store, all of the data within consists of an indexed key and a value, hence the name. Examples of this type of database include Cassandra, DyanmoDB, Azure Table Storage (ATS), Riak, BerkeleyDB.

Column store—(also known as wide-column stores) instead of storing data in rows, these databases are designed for storing data tables as sections of columns of data, rather than as rows of data. While this simple description sounds like the inverse of a standard database, wide-column stores offer very high performance and a highly scalable architecture. Examples include HBase, BigTable, and HyperTable.

Document database—expands on the basic idea of key-value stores where "documents" contain more complex in that they contain data and each document is assigned a unique key, which is used to retrieve the document. These are designed for storing, retrieving, and managing document-oriented information, also known as semi-structured data. Examples include MongoDB and CouchDB.

Figure 4:
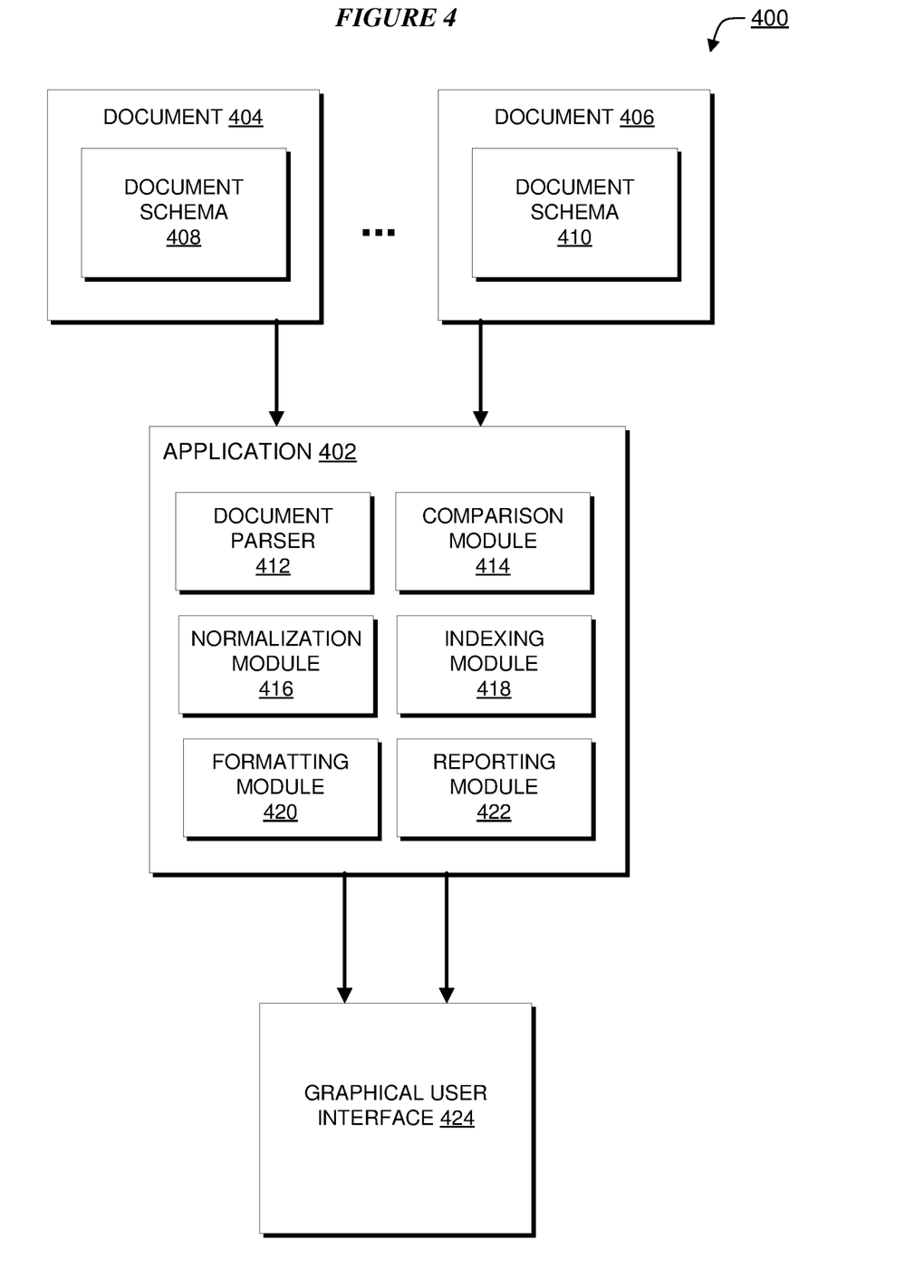
FIG. 4 depicts a block diagram of merging two documents in accordance with an illustrative embodiment.

With reference to FIG. 4, this figure depicts a block diagram for merging two documents in accordance with an illustrative embodiment. Application 402 is an example of application 105 in FIG. 1 and application 312 in FIG. 3.

Documents 404 and 406 may be stream of unstructured data represented in a file container, such as Microsoft® Word document file format (e.g., .doc format) or WordPefect® file format (e.g., .wp format). In some embodiments, documents 404 and 406 may be a stream of unstructured data represented as an HTML page in which contents can be assigned with a set of HTML tags such as <body>, or script tags such as <script>. In yet other embodiments, documents 404 and 406 may be structured data, wherein the content may be formatted into a tabular format including rows and/or columns.

Documents 404 and 406 may be retrieved from a database, such as database 320 in FIG. 3, into which users previously submitted said documents. In other embodiments, documents 404 and 406 may be respectively retrieved from different databases or other different sources. For example, document 404 may be retrieved from a database administered by the compliance department, whereas document 406 may be retrieved from a database administered by the operational risk department. Document 404 may include document schema 408 which provide a first set of risk assessment ratings for a plurality of risk categories. Similarly, document 406 may include document schema 410 which also provide a second of risk assessment ratings. In some embodiments, the first set of risk assessment ratings and the second set of risk assessment ratings may include content that exactly matches. In other embodiments, the first set of risk assessment ratings and the second set of risk assessment ratings may include content that only partially overlaps each other. In yet other embodiments, the first set of risk assessment ratings and the second set of risk assessment ratings may include content that does not overlap each other.

As mentioned above, document schemas 408 and 410 may include a set of categories and values associated with each of the categories, which indicate the extent of risk involved with an organization or part of the organization. In other embodiments, the set of categories and values may be limited to those indicative of risk for a subset of activities conducted by the organization or part of the organization.

Documents 404 and 406, e.g., risk assessment reports, may be generated through calculating an aggregate of a set of categories and values associated with each of the categories. In some embodiments, the values may be expressed as a character string variable such as "low," "high," or "insufficient." In other embodiments, the values associated with the categories may be expressed as an integer or floating number variable such as "3" or "4.5." In one embodiment, a category in document schemas 408 and 410 is a string variable describing the risk category associated with the organization. In several embodiments, risk categories may include but are not limited to, legal/regulatory impact, reputational impact, client/customer-related risk, sanctions, business activity, governance and management oversight, operational controls, and policies and procedures.

Application 402 generally resides in a server, such as servers 104 and 106 of FIG. 1, and includes document parser 412, document comparison module 414, normalization module 416, indexing module 418, formatting module 420, and reporting module 422. In this embodiment, document parser 412 receives documents 404 and 406. Document parser 412 identifies the schema of documents 404 and 406 then extracts metadata associated with each document, including XML and/or JSON strings which associate content with a set of tag elements. In some embodiments, document parser 412 may use a document object model (DOM) parser to generate a data structure (e.g., a tree structure) that arranges all of the document elements in a readable format. In some embodiments, the tags may denote the risk categories, and the content may denote values indicating the Document comparison module 414 receives the extracted tags and associated content of parsed documents 404 and 406. Document comparison module then performs a matching algorithm looping through each tag within document 404 to determine a matching tag within document 406. This operation is performed to ensure that the corresponding tags can be mapped even when both tags of documents 404 and 406 may be in different positions based on the document schema.

In some embodiments, normalization module 416 may detect that weight factors have been applied to the values of the categories in document schemas 408 and 410 as identified by document parser 412. If detected, normalization module 416 may remove the detected weight factors and/or apply default weight values to normalize the values assigned to the categories. After normalization, the processed data fields can be processed through document comparison module 414.

Indexing module 418 receives the output from document comparison module 414, which provides a set of matching tags between documents 404 and 406. Indexing module 418 stores the set of matching tags in a database, such as database 320 in FIG. 3, and indexes the stored tags for easy retrieval at a later time. Each stored tags may be assigned a unique identifier, which may be indicative of a time and/or as to when the tags were inserted into the database. Indexing module 418 may use the same database as the one in which documents 404 and 406 are stored, or may use a different database which may reside on a different network.

Formatting module 420 merges of documents 404 and 406 and provides the merged documents to be simultaneously displayed on graphical user interface 424, such as a computer screen. During the merge operation, formatting module retrieves the stored matching tags from the database and rearranges document schemas 408 and 410 so that both fields are aligned on the same graphical user interface position when the output is displayed to the user. In some embodiments, formatting module 420 casts document schemas 408 and 410 into interactive graphic elements (e.g., HTML drag-and-drop element) which allows the user to manipulate the position of document schemas 408 and 410 within the single user interface screen.

In some embodiments, reporting module 422 detects a change in document schema 408 in document 404 then issues a notification to the source assigned to document 406. More specifically, reporting module 422 detects that a value in document schema 408 has been changed then identifies at least one tag associated with document schema 408. Reporting module 422 then determines at least one tag from document schema 410 that matches the identified tags associated with document schema 408. In some embodiments, reporting module 422 may execute a query to search the indexing database into which indexing module stores its output. In some embodiments, the identified tag can be used as a query to determine the matching tags from document schema 410. Responsive to determining the at least matching tag from document schema 410, reporting module issues a notification to the source that generated document 406, in which the notification may include a log indicating the changes made to document 404 (and document schema 408). In some embodiments, the notification may include tags in document schema 410 that match the tags that were affected by the change in document schema 408.

Figure 5:
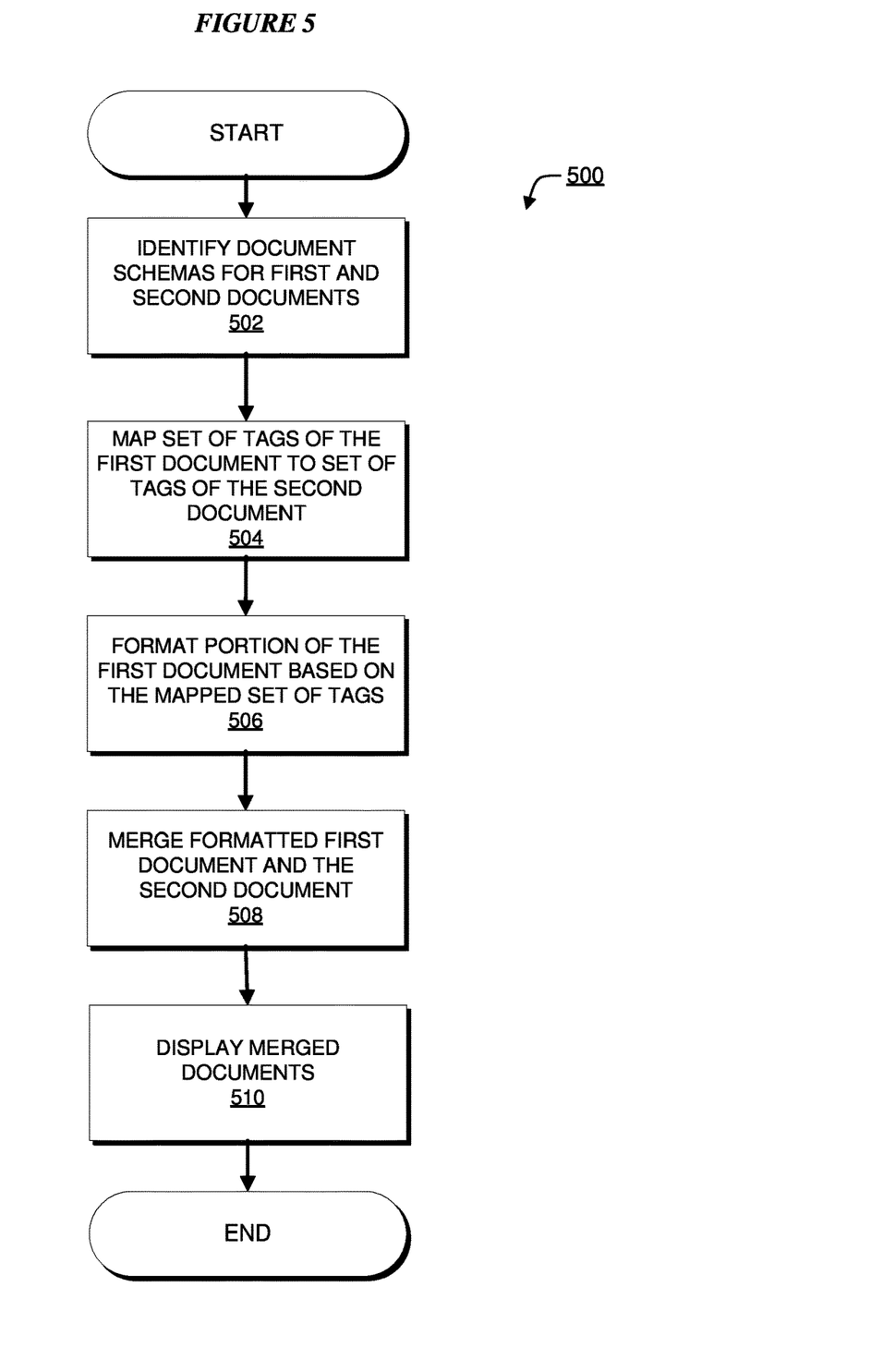
FIG. 5 depicts a flowchart of an example process for merging documents in accordance with an illustrative embodiment.

With reference to FIG. 5, this figure depicts a flowchart of an example process for merging two documents in accordance with an illustrative embodiment. Process 500 may be implemented in application 402 in FIG. 4.

The application identifies document schemas for a first document from a first data source, e.g., database 320, and a second document from a second data source (block 502). In this embodiment, the document schema includes a set of tags and data elements corresponding to the set of tags. The application maps the set of tags of the first document to the set of tags of the second document based on the identified document schemas (block 504).

The application formats portion of the first document based on the mapped set of tags (block 506). In one embodiment, the formatted portion of the first document is positioned parallel to the corresponding portion of the second document. The application merges the formatted first document and the second document (block 508) and causes a computer device to display the merged documents (block 510). The application process 500 terminates thereafter.

Thus, a computer implemented method, system or apparatus, and computer program product are provided in the illustrative embodiments for merging two documents that may contain different perspectives and/or bias. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of merging documents comprising:
   identifying document schemas for a first document from a first data source and a second document from a second data source, wherein the document schema includes a set of tags and data elements corresponding to the set of tags;
   mapping the set of tags of the first document to the set of tags of the second document based on the identified document schemas;
   assigning an interactive graphical user interface element to each of the set of tags for the first and second documents;
   merging the first document and the second document, wherein portions of the first document and the second document are aligned based on the mapped set of tags before said merging; and
   causing a computer device to display the merged documents and the mapped set of tags corresponding to the first document and the second document, wherein user interactions with each of the interactive graphical user interface elements assigned to each of the set of tags causes the portions to be repositioned within the merged documents.

2. The method according to claim 1, wherein
   the first document is a risk assessment report generated from compliance data source, and
   the second document is a risk assessment report generated from operational risk data source.

3. A computer-implemented method, comprising:
   identifying a first document schema for a first document from a first data source;
   identifying a second document schema for a second document schema from a second data source, each of the document schema includes a set of tags and data elements corresponding to the set of tags;
   mapping the set of tags of the first document to the set of tags of the second document based on the first and second document schemas to generate a mapped set of tags;
   formatting a portion of the first document based on the mapped set of tags, the formatted portion of the first document is visually positioned parallel to a corresponding portion of the second document; and
   merging the formatted first document and the second document.

4. The method of claim 3, further comprising
   receiving, after the first and second documents being merged, user input to export the merged documents;
   reverting, after the user input is received, the merging and the formatting; and
   exporting, separately, the first document and second document.

5. The method of claim 3, wherein
   the first document and second document include identical set of tags but different data elements corresponding to the identical set of tags.

6. The method of claim 5, further comprising:
   determining that data elements corresponding to the identical set of tags have been applied with weighted variables; and
   normalizing the data elements that have been applied with weighted variables.

7. The method of claim 3, wherein
   the first document is a risk assessment report generated from a compliance data source, and
   the second document is a risk assessment report generated from an operational risk data source.

8. The method of claim 3, further comprising:
   detecting that content within the portion of the first document has been altered by user input; and
   issuing a notification to the second data source that the portion of the first document has been altered.

9. The method of claim 3, further comprising:
   formatting a portion of the second document based on the mapped set of tags, wherein the formatted portion of the second document is visually positioned parallel to a corresponding portion of the first document.

10. A computer hardware system, comprising:
a hardware processor configured to perform:
identifying a first document schema for a first document from a first data source;
identifying a second document schema for a second document schema from a second data source, each of the document schema includes a set of tags and data elements corresponding to the set of tags;
mapping the set of tags of the first document to the set of tags of the second document based on the first and second document schemas to generate a mapped set of tags;
formatting a portion of the first document based on the mapped set of tags, the formatted portion of the first document is visually positioned parallel to a corresponding portion of the second document; and
merging the formatted first document and the second document.

11. The system of claim 10, wherein the hardware processing is further configured to perform:
receiving, after the first and second documents being merged, user input to export the merged documents;
reverting, after the user input is received, the merging and the formatting; and
exporting, separately, the first document and second document.

12. The system of claim 10, wherein
the first document and second document include identical set of tags but different data elements corresponding to the identical set of tags.

13. The system of claim 12, wherein the hardware processing is further configured to perform:
determining that data elements corresponding to the identical set of tags have been applied with weighted variables; and
normalizing the data elements that have been applied with weighted variables.

14. The system of claim 10, wherein
the first document is a risk assessment report generated from a compliance data source, and
the second document is a risk assessment report generated from an operational risk data source.

15. The system of claim 10, wherein the hardware processing is further configured to perform:
detecting that content within the portion of the first document has been altered by user input; and
issuing a notification to the second data source that the portion of the first document has been altered.

16. The system of claim 10, wherein the hardware processing is further configured to perform:
formatting a portion of the second document based on the mapped set of tags, wherein
the formatted portion of the second document is visually positioned parallel to a corresponding portion of the first document.

17. A computer program product, comprising:
a computer readable storage medium having stored therein program instructions,
the program instructions, which when executed by a computer hardware system, cause the computer hardware system to perform:
identifying a first document schema for a first document from a first data source;
identifying a second document schema for a second document schema from a second data source, each of the document schema includes a set of tags and data elements corresponding to the set of tags;
mapping the set of tags of the first document to the set of tags of the second document based on the first and second document schemas to generate a mapped set of tags;
formatting a portion of the first document based on the mapped set of tags, the formatted portion of the first document is visually positioned parallel to a corresponding portion of the second document; and
merging the formatted first document and the second document.

18. The computer program product of claim 17, wherein the program instructions further cause the computer hardware system to:
receiving, after the first and second documents being merged, user input to export the merged documents;
reverting, after the user input is received, the merging and the formatting; and
exporting, separately, the first document and second document.

19. The computer program product of claim 17, wherein the first document and second document include identical set of tags but different data elements corresponding to the identical set of tags.

20. The computer program product of claim 19, wherein the program instructions further cause the computer hardware system to:
determining that data elements corresponding to the identical set of tags have been applied with weighted variables; and
normalizing the data elements that have been applied with weighted variables.

21. The computer program product of claim 17, wherein
the first document is a risk assessment report generated from a compliance data source, and
the second document is a risk assessment report generated from an operational risk data source.

22. The computer program product of claim 17, wherein the program instructions further cause the computer hardware system to:
detecting that content within the portion of the first document has been altered by user input; and
issuing a notification to the second data source that the portion of the first document has been altered.

23. The computer program product of claim 17, wherein the program instructions further cause the computer hardware system to:
formatting a portion of the second document based on the mapped set of tags, wherein
the formatted portion of the second document is visually positioned parallel to a corresponding portion of the first document.

* * * * *